United States Patent [19]

Wolfram

[11] 4,411,350
[45] Oct. 25, 1983

[54] REVERSING CONVEYER TRACK

[76] Inventor: Frank Wolfram, 19986 Rollins Rd., Lake Villa, Ill. 60046

[21] Appl. No.: 299,392

[22] Filed: Sep. 4, 1981

[51] Int. Cl.³ .............................................. B65G 13/00
[52] U.S. Cl. .................................. 193/35 A; 198/417; 193/46
[58] Field of Search ..................... 193/35 R, 35 A, 44, 193/46; 198/406, 413, 416, 417

[56] References Cited

U.S. PATENT DOCUMENTS

| | | | |
|---|---|---|---|
| 2,905,295 | 9/1959 | Anderson | 193/46 |
| 3,189,159 | 6/1965 | Shields | 193/44 X |
| 4,000,796 | 1/1977 | Bolton et al. | 193/35 A |
| 4,047,712 | 9/1977 | Burkhardt | 198/417 X |

Primary Examiner—John J. Love
Assistant Examiner—Gene A. Church
Attorney, Agent, or Firm—John R. Garrett

[57] ABSTRACT

This disclosure depicts a novel reversing conveyer track for changing the orientation, direction and spacing of books for use with book construction machinery. The reversing conveyor track first comprises a means for accepting the books and for establishing a predetermined spacing of the books. The means for accepting the books outputs the books with a predetermined velocity. The conveyor track further comprises a means for orienting and directing the books which is attached to the means for accepting the books. The orienting of the books is a change from an edge position to a side position and the direction of the books is a direction of movement different from the input movement direction of books to the means for accepting the books.

15 Claims, 7 Drawing Figures

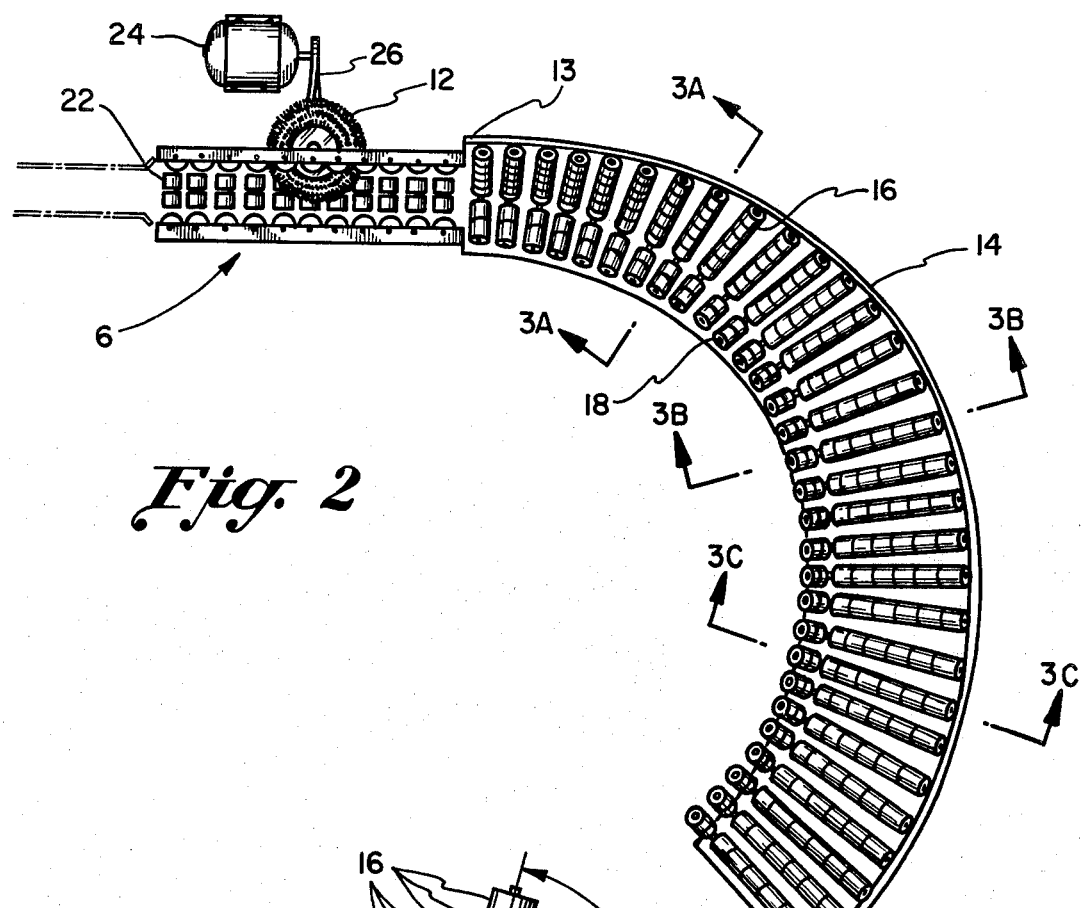
*Fig. 2*
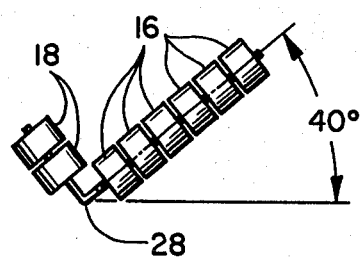
*Fig. 3A*
*Fig. 3B*
*Fig. 3C*

REVERSING CONVEYER TRACK

BACKGROUND OF THE INVENTION

This invention relates in general to conveyer tracks and in particular to a reversing conveyer track for changing the orientation, direction and spacing of books. The reversing conveyer track is used with book construction machinery. Conventionally, the different machines used for producing books are linked together in a straight line due to the fact that a means for changing the direction of books has never been designed which is economical and practical before the present invention. Books can be easily damaged and until the present invention, a machine to change the orientation, direction and spacing of books has not been feasible. Although machines do exist in the prior art which can do one of the three operations it has not been possible until the present invention to simultaneously change the orientation, direction and spacing of the books in production.

OBJECTS OF THE INVENTION

It is a general object of the present invention to provide a novel reversing conveyer track for use with book construction machinery.

It is a more specific object of the present invention to provide a reversing conveyer track for simultaneously changing the orientation, direction and spacing of books.

It is another object of the present invention to provide a reversing conveyer track which is simple in construction and effective in operation.

It is a further object to provide a reversing conveyer track which can be used with different thickness and size books.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings, in the several figures of which like reference numerals identify like elements, and in which:

FIG. 2 is a top view of the novel invention.
FIGS. 3A, 3B, and 3C show various cutaway side views of the novel invention in FIG. 2.

DESCRIPTION OF THE PREFERRED EMBODIMENT

This invention pertains to a novel reversing conveyer track for simultaneously changing the orientation, direction and spacing of books. The reversing conveyer track is designed to be used with book construction machinery. The novel reversing conveyer track provides a simple and effective means for handling the books. Other types of conveyer tracks have proved to be unsuitable due to the books being easily damaged.

In general terms, the present invention involves a reversing conveyer track which comprises a means for accepting the books and is attached to one of the book construction machines. The means for accepting the books also establishes a predetermined spacing of the books and outputs the books with a predetermined velocity. The reversing conveyer track further comprises a means for orienting and directing the books and is attached to the means for accepting the books. The orienting of the books is a change from an edge position to a side position and the direction of the books is a direction of movement different from the input movement direction of books to the means for accepting the books.

Figure 1:
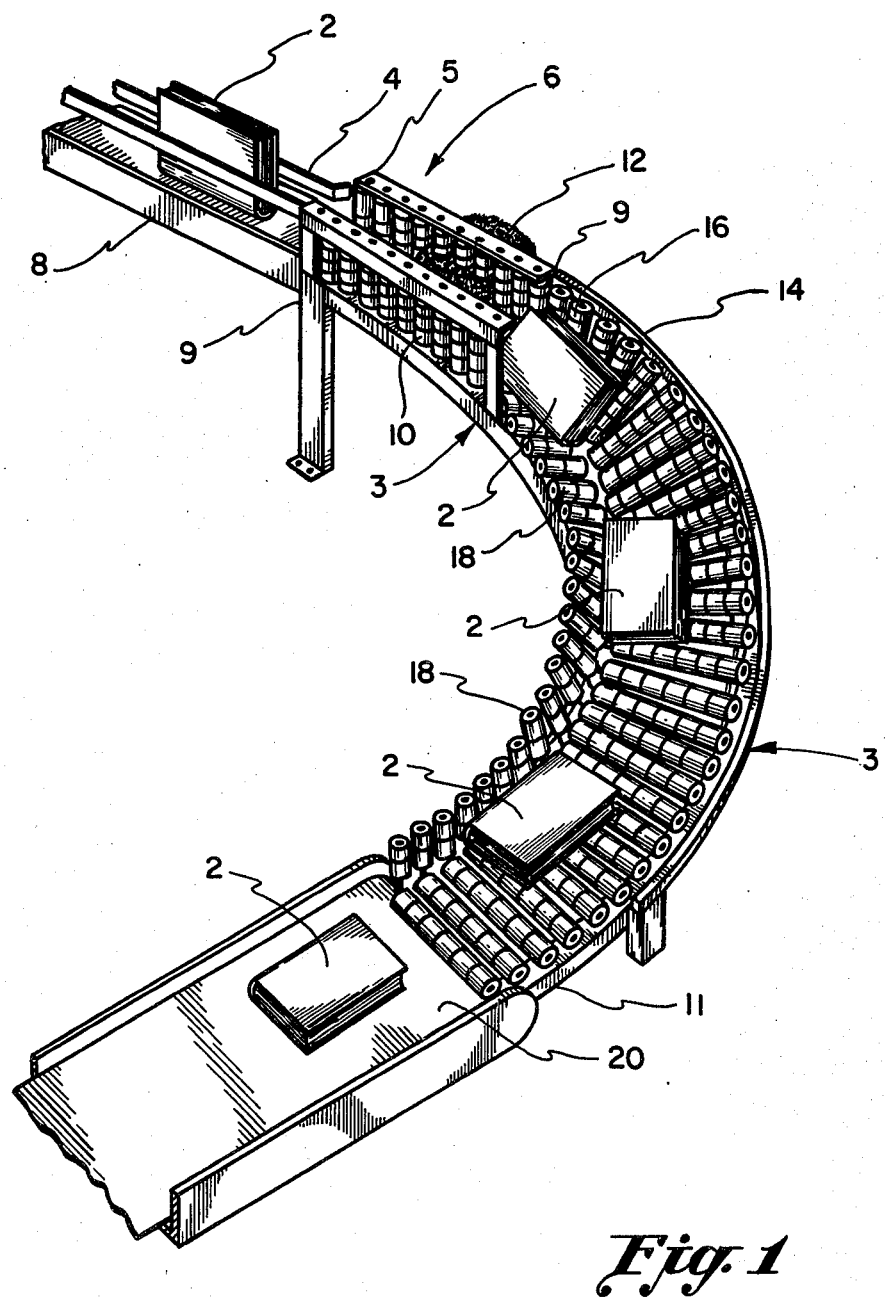
FIG. 1 is a perspective view of the novel invention.

Referring now to FIG. 1 the means for accepting the books or roller guide 6 has an input end 5 and an output end 9. It is attached to a frame 3 having a first end 9 and a second end 11. The first end 9 of the frame 3 is higher than the second 11 and forms a predetermined angle with the second end 11. The roller guide 6 is attached to the first end 9 of the frame 3. The roller guide receives the books 2 from an input conveyor 8. The books 2 are oriented in an upright edge position and are held in that position by guide rails 4 on the input conveyor 8. The books 2 are received at the input end 5 of the roller guide 6.

A velocity control brush 12 is attached to the roller guide 6 for contacting the books and moving the books through the roller guide 6. The velocity control brush 12 rotates with a predetermined angular velocity.

A descending and variable angle roller track 14 has an upper end 13 and a lower end 15 and is attached to the frame. See FIGS. 2, 3A, 3B, and 3C. The upper end 13 of the roller track 14 is attached to and is in alignment with the output end 7 of the roller guide 6 and the lower end 15 is attached to the second end 11 of the frame 3.

The roller guide 6 and the velocity control brush 12 determine the spacing of the books 2 and the roller track 14 determines the orientation of the books 2 and the direction of the books 2 leaving the reversing conveyer track. As shown in FIG. 1 the books start on an edge position and as they proceed through the reversing conveyer track the books 2 gradually assume a position lying on their side proceeding in a new direction and having a predetermined spacing between the books 2.

Figure 4:
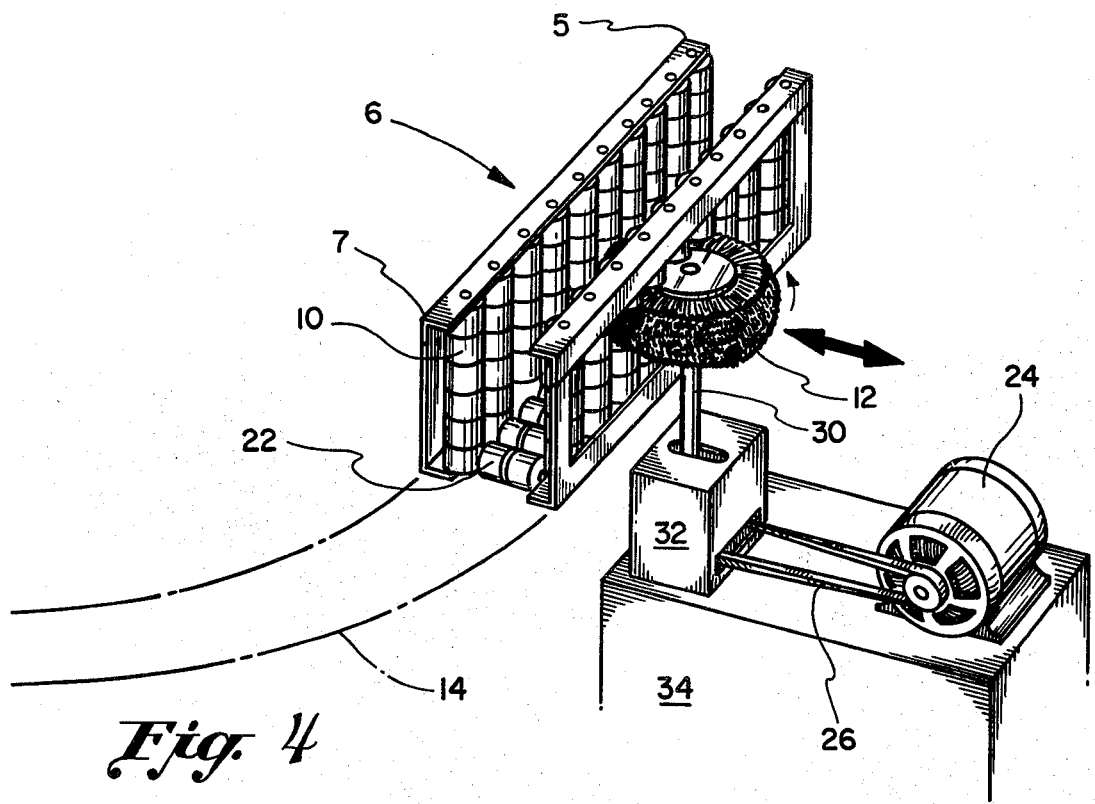
FIG. 4 is a perspective view of a portion of the invention.
Figure 5:
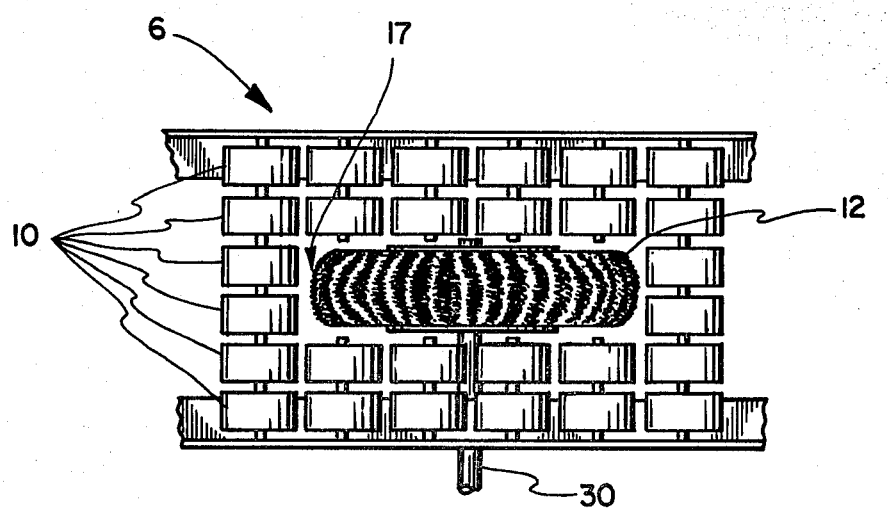
FIG. 5 is a side view of a section of the portion shown in FIG. 4.

As shown in FIGS. 4 and 5, the roller guide 6 is composed of two parallel series of upright closely spaced stacks 10 of rollers. These stacks 10 of rollers have a predetermined length and predetermined spacing between the two series of upright stacks 10 of rollers. The roller guide 6 is also composed of a series of horizontal closely spaced rollers 22 having a predetermined length substantially equal to the predetermined length of the upright stacks 10 of rollers. FIGS. 2, 4, and 5 show the details of the roller guide 6. The series of horizontally closely spaced rollers 22 are positioned near the bottom and between the upright stacks 10 of rollers. The width of the horizontal rollers 22 is substantially equal to the predetermined spacing between the upright stacks 10 of rollers.

As shown in FIGS. 4 and 5 the velocity control brush 12 has a predetermined width less than the height of the upright stacks 10 of rollers. The brush is positioned substantially in the center of and extending through an opening 17 in one of the upright stacks 10 of rollers. As shown in FIG. 5 the brush occupies a space equivalent to four rows and two center rollers of the rollers 10. The velocity control brush 12 is adjustable in a direction substantially perpendicular to the length of the series of upright rollers 10 such that the brush 12 may be positioned deeper in the roller guide 6 for use with thin books.

As shown in FIG. 4 the velocity control brush 12 is adjustable and is driven by a shaft 30 connected to a control box 32. The control box 32 is connected by belt 26 to motor 24 and the assembly is supported by support 34. Numerous other methods of controlling and adjusting the velocity control brush 12 may be utilized. The velocity control brush 12 rotates in such a manner as shown in FIG. 4 that the books 2 are moved from the input end 5 of the roller guide 6 to the output end 7.

Referring now to FIGS. 2 and 3A, 3B, and 3C the descending and variable angle roller track 14 comprises a series of back rollers 16 and edge rollers 18. The edge rollers 18 are oriented substantially at a right angle to the back rollers 16 at location 28. A multitude of back and edge rollers 16 and 18 are combined to form the roller track 14. At the upper end 13 of the roller track 14 the back rollers 16 are substantially vertical and the edge rollers 18 are substantially horizontal. At the lower end 15 of the roller track 14 the back rollers 16 are substantially horizontal and the edge rollers 18 are substantially vertical. The intermediate back and edge rollers 16 and 18 between the upper and lower ends 13 and 15 are oriented at consecutively different angles to form a smoothly descending and changing angular roller track 14. The intermediate back and edge rollers 16 and 18 have a predetermined rate of angular change. At position 3A, and shown in FIG. 3A the axis of the back rollers 16 form an angle of 75 degrees with the horizontal. As shown in FIG. 3B at that position the back rollers 16 form an angle of 40 degrees with the horizontal and in FIG. 3C the back rollers 16 form an angle of 10 degrees with the horizontal.

The preferred embodiment has the following dimensions and specifications. The rollers are formed of plastic and are 13/16" wide and have an O.D. of 1⅛". The length of the six back rollers of the roller track is 6". The velocity control brush is 2" thick and has an O.D. of 6" and has nylon bristles. The difference in height from the input end of the roller guide to the lower ends of the roller track is 14". The overall length of the preferred embodiment from the side of the roller guide with the velocity control brush to the lower end of the roller track is 38½" and from the input end of the roller guide to the for edge of the roller track is 38". Positions 3A, 3B, and 3C occur respectively at distances of 16", 20" and 33" from the upper end of the roller track.

The invention is not limited to the particular details of the apparatus depicted and other modifications and applications are contemplated. Certain other changes may be made in the above described apparatus without departing from the true spirit and scope of the invention herin envolved. It is intended therefore, that the subject matter in the above depiction shall be interpreted as illustrative and not in a limiting sense.

What is claimed is:

1. A reversing conveyer track for simultaneously changing the orientation, direction and spacing of books for use with book construction machinery, said reversing conveyer track comprising:

means for accepting the books attached to one of the book construction machines;

variable means for establishing a predetermined spacing of the books and for outputting the books from said means for accepting with a predetermined velocity, said variable means attached to said means for accepting and in momentary contact with the books;

means for orienting and directing the books attached to said means for accepting the books, said orienting of the books being a change from an edge position to a side position and said direction of said books being a direction of movement different from the input movement direction of books to the means for accepting the books.

2. A reversing conveyer track for simultaneously changing the orientation, direction and spacing of books for use with book construction machinery, said reversing conveyer track comprising:

a frame having a first end and a second end, said first end being higher than said second end and forming a predetermined angle with said second end;

a roller guide having an input end and an output end and attached to said first end of said frame for receiving the books, said books being oriented in an upright edge position;

a velocity control brush attached to said roller guide for contacting said books and moving said books through said roller guide, said velocity control brush rotating with a predetermined angular velocity; and a descending and variable angle roller track having an upper end and a lower end and attached to said frame, said upper end attached to and in alignment with said output end of said roller guide and said lower end attached to said second end of said frame;

wherein said roller guide and said velocity control brush determine the spacing of the books, and said roller track determines the orientation of the books and the direction of the books leaving said reversing conveyer track.

3. The apparatus described in claim 2 wherein said roller guide is composed of two parallel series of upright closely spaced stacks of rollers having a predetermined length and predetermined spacing, said roller guide also composed of a series of horizontal closely spaced rollers having a predetermined length substantially equal to said predetermined length of said upright stacks of rollers and positioned near the bottom and between said upright stacks of rollers, the width of said horizontal rollers being substantially equal to said predetermined spacing between said upright stacks of rollers.

4. The apparatus described in claim 3 wherein said velocity control brush has a predetermined width less than the height of said upright stacks of rollers, said brush positioned substantially in the center of and extending through an opening in one of said upright stacks of rollers.

5. The apparatus described in claim 4 wherein said velocity control brush is adjustable in a direction substantially perpendicular to the length of said series of upright rollers, such that said brush may be positioned deeper in said roller guide for use with thin books.

6. The apparatus described in claim 2 wherein said descending and variable angle roller track comprises a series of back rollers and edge rollers said edge rollers being oriented substantially at a right angle to said back rollers.

7. The apparatus described in claim 6 wherein at said upper end of said roller track said back rollers are substantially vertical and said edge rollers are substantially horizontal, at said lower end of said roller track said back rollers are substantially horizontal and said edge rollers are substantially vertical, and wherein said intermediate back and edge rollers between said upper and lower ends are oriented at consecutively different angles to form a smoothly descending and changing angular roller track.

8. The apparatus described in claim 7 wherein said intermediate back and edge rollers have a predetermined rate of angular change.

9. The apparatus described in claim 7 wherein said intermediate back rollers are at one angle of 75°, 40°, and 10° at distances respectively of approximately 16", and 33" from said upper end of said roller tracks, said other intermediate rollers being at other graduated angles to form a smoothly descending and changing angular roller track.

10. The apparatus described in claim 2 wherein said upper end of said roller track is approximately 14" higher than said lower end of said roller track.

11. A reversing conveyer track for changing the orientation, direction and spacing of books for use with book construction machinery, said reversing conveyer track comprising:

a frame having a first end and a second end, said first end being higher than said second end and forming a predetermined angle with said second end;

a roller track guide having an input end and an output end and attached to said first end of said frame for receiving the books, said books being oriented in an upright edge position, said roller track guide comprising two parallel series of upright closely spaced stacks of rollers and a series of horizontal closely spaced rollers near the bottom of said parallel series of upright stacks of rollers, one of said series of upright stacks of rollers having an opening approximately in the center thereof;

a velocity control brush attached to said roller guide and extending through said opening in said roller track guide for contacting said books and moving said books through said roller track guide, said velocity control brush rotating with a predetermined angular velocity substantially parallel to said horizontal rollers of said roller track guide, said velocity control brush being adjustable in a direction substantially perpendicular to the length of said series of upright rollers, such that said brush may be positioned deeper in said roller guide for use with thin books;

a descending and variable angle roller track having an upper end and a lower end attached to said frame, said upper end attached to and in alignment with said output end of said roller guide and said lower end attached to said second end of said frame, said roller track comprising a series of back rollers and edge rollers, said edge rollers being oriented substantially at a right angle to said back rollers, and at said upper end of said roller track said back rollers are substantially vertical and said edge rollers substantially horizontal, at said lower end of said roller track said back rollers are substantially horizontal and said edge rollers are substantially vertical, and wherein said intermediate back and edge rollers between said upper and lower ends are oriented at consecutively different angles to form a smoothly descending and changing angular roller track.

12. The apparatus described in claim 11 wherein two parallel series of upright closely spaced stacks of rollers have a predetermined length and predetermined spacing, and series of horizontal closely spaced rollers has a predetermined length substantially equal to said predetermined length of said upright stacks of rollers and positioned near the bottom and between said upright stacks of rollers, the width of said horizontal rollers being substantially equal to said predetermined spacing between said upright stacks of rollers.

13. The apparatus described in claim 11 wherein said velocity control brush has a predetermined width less than the height of said upright stacks of rollers, said brush positioned substantially in the center of and extending through said opening in one of said upright stacks of rollers.

14. The apparatus described in claim 11 wherein said intermediate back rollers are at an angle of 75°, 40° and 10° at a distance respectively of approximately 16", 20", and 33" from said upper end of said roller track, said other intermediate rollers being at other graduated angles to form a smoothly descending and changing angular roller track.

15. The apparatus described in claim 11 wherein said upper end of said roller track is approximately 14" higher than said lower end of said roller track.

* * * * *